United States Patent
Jordan et al.

(10) Patent No.: US 12,254,717 B2
(45) Date of Patent: Mar. 18, 2025

(54) INTERACTIVE IMAGERY SYSTEMS AND METHODS

(71) Applicant: Universal City Studios LLC, Universal City, CA (US)

(72) Inventors: Robert Michael Jordan, Orlando, FL (US); Anthony Melo, Orlando, FL (US); Angelo Pagliuca, Orlando, FL (US); Brandon David Burnette, Philadelphia, PA (US); John Adams, Orlando, FL (US); Jacob David Allinson, Orlando, FL (US); Eric To Chan, Kissimmee, FL (US); Mark James Traynor, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/212,587

(22) Filed: Jun. 21, 2023

(65) Prior Publication Data
US 2023/0419726 A1    Dec. 28, 2023

Related U.S. Application Data

(60) Provisional application No. 63/354,886, filed on Jun. 23, 2022.

(51) Int. Cl.
*G06V 40/20*    (2022.01)
*G06F 3/01*    (2006.01)
(Continued)

(52) U.S. Cl.
CPC .............. *G06V 40/20* (2022.01); *G06F 3/012* (2013.01); *G06F 3/013* (2013.01); *G06F 3/16* (2013.01);
(Continued)

(58) Field of Classification Search
None
See application file for complete search history.

(56) References Cited

U.S. PATENT DOCUMENTS 9,805,233 B2    10/2017  Sample et al.
10,019,992 B2    7/2018  Lehman et al.
(Continued)

FOREIGN PATENT DOCUMENTS

CN    111949131 A    11/2020

OTHER PUBLICATIONS

PCT/US2023/026002 International Search Report and Written Opinion mailed Oct. 2, 2023.
(Continued)

*Primary Examiner* — Nicholas J Lee
(74) *Attorney, Agent, or Firm* — Fletcher Yoder, P.C.

(57) ABSTRACT

An interactive portrait system includes a camera configured to capture imagery of an environment and a controller. The controller is configured to analyze the imagery to identify a guest in the environment, instruct an output device to provide an initial output to attempt to interact with the guest, and analyze the imagery to identify a behavior of the guest during the initial output, after the initial output, or both. The controller is also configured to evaluate the behavior of the guest using one or more artificial intelligence algorithms to determine whether the guest responded to the initial output. The controller is further configured to, in response to determining that the guest responded to the initial output, instruct the output device to provide an additional output to continue to attempt to interact with the guest.

20 Claims, 4 Drawing Sheets

(51) Int. Cl.
*G06F 3/16* (2006.01)
*G06T 13/40* (2011.01)
*G06T 13/80* (2011.01)
*G06V 40/10* (2022.01)

(52) U.S. Cl.
CPC .............. *G06T 13/40* (2013.01); *G06T 13/80* (2013.01); *G06V 40/10* (2022.01)

(56) References Cited

U.S. PATENT DOCUMENTS

| | | |
|---|---|---|
| 10,555,393 B1 | 2/2020 | Fu et al. |
| 10,845,975 B2 | 11/2020 | Vyas et al. |
| 11,010,129 B1 | 5/2021 | Rakshit |
| 11,151,992 B2 | 10/2021 | Cui et al. |
| 2011/0007142 A1* | 1/2011 | Perez .................... A63F 13/213 348/E7.085 |
| 2015/0058812 A1* | 2/2015 | Lindh .................... H04S 7/308 715/863 |
| 2015/0156030 A1 | 6/2015 | Fadell et al. |
| 2016/0193732 A1 | 7/2016 | Breazeal et al. |
| 2017/0308965 A1* | 10/2017 | Morris ................... G06Q 50/06 |
| 2019/0095775 A1 | 3/2019 | Lembersky et al. |
| 2019/0187787 A1 | 6/2019 | White et al. |
| 2019/0201806 A1 | 7/2019 | Weston |
| 2019/0278555 A1* | 9/2019 | Carvajal ................. G06F 3/165 |
| 2020/0201048 A1* | 6/2020 | Nakata .................... G09F 19/12 |
| 2020/0322754 A1* | 10/2020 | Soule ................. G06Q 30/0271 |
| 2020/0405257 A1 | 12/2020 | Samec et al. |
| 2021/0191506 A1 | 6/2021 | Wang et al. |
| 2021/0303107 A1* | 9/2021 | Pla I Conesa ...... G06F 3/04845 |
| 2021/0358188 A1 | 11/2021 | Lebaredian et al. |

OTHER PUBLICATIONS

Screen captures from YouTube video entitled "Meet D3-09, an interactive droid experience on the Galactic Starcruiser Halcyon," 1 page, uploaded on Feb. 25, 2022, by "The Disney Blog." Retrieved from Internet: <https://www.youtube.com/watch?v=YipH4MelilM>.

* cited by examiner

INTERACTIVE IMAGERY SYSTEMS AND METHODS

CROSS-REFERENCE TO RELATED APPLICATION

This application claims priority to and the benefit of U.S. Provisional Application No. 63/354,886, entitled "INTERACTIVE IMAGERY SYSTEMS AND METHODS" and filed Jun. 23, 2022, which is incorporated by reference herein in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Theme parks, amusement parks, theaters, movie theaters, stadiums, concert halls, and the like provide guests with various immersive experiences. These entertainment venues may include show attractions (e.g., movies, plays, rides, games) that provide the guests with the immersive experiences. For example, traditional show attractions may utilize various combinations of physical show elements (e.g., props), displayed elements (e.g., animations), and lighting to create visual effects for the guests. As entertainment venues become increasingly popular, the guests have increased expectations for improvements and changes to the immersive experiences.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from embodiments set forth below.

In an embodiment, an interactive portrait system includes a camera configured to capture imagery of an environment and a controller. The controller is configured to analyze the imagery to identify a guest in the environment, instruct an output device to provide an initial output to attempt to interact with the guest, and analyze the imagery to identify a behavior of the guest during the initial output, after the initial output, or both. The controller is also configured to evaluate the behavior of the guest using one or more artificial intelligence algorithms to determine whether the guest responded to the initial output. The controller is further configured to, in response to determining that the guest responded to the initial output, instruct the output device to provide an additional output to continue to attempt to interact with the guest.

In an embodiment, an entertainment venue includes a path that traverses an interactive area, a display and a speaker located proximate to the interactive area, a camera configured to capture imagery of the interactive area, a microphone configured to capture sounds within the interactive area, and a controller. The controller is configured to analyze the imagery to identify a guest traveling along the path toward the interactive area and instruct the display, the speaker, or both to provide an initial output to attempt to interact with the guest as the guest approaches the interactive area. The controller is also configured to analyze the imagery, the sounds, or both to identify a behavior of the guest during the initial output, after the initial output, or both. The controller is further configured to evaluate the behavior of the guest using one or more artificial intelligence algorithms to determine whether the guest responded to the initial output. The controller is further configured to, in response to determining that the guest responded to the initial output, instruct the display and the speaker to provide an additional output to conduct a conversational interaction with the guest.

In an embodiment, a method of operating an interactive portrait system in an entertainment venue includes analyzing, using one or more processors, imagery captured by a camera to identify a behavior of a guest. The method also includes evaluating, using the one or more processors and one or more artificial intelligence algorithms, the behavior of the guest to determine whether the guest demonstrated signs of interest in an interactive area of the entertainment venue. The method further includes, in response to determining that the guest demonstrated signs of interest in the interactive area of the entertainment venue and using the one or more processors, instructing an output device to provide an initial output to attempt to interact with the guest.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
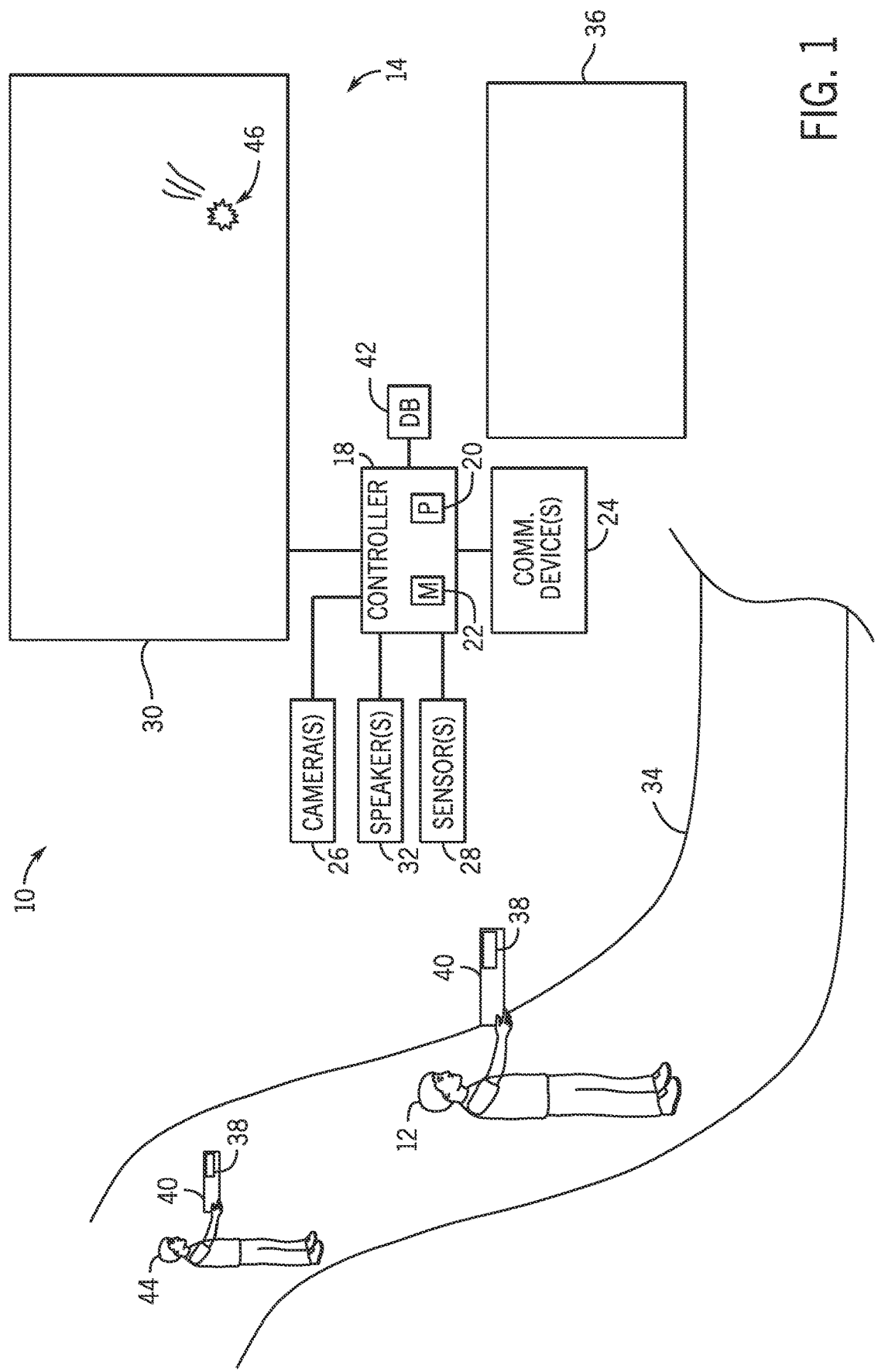
FIG. 1 is a schematic diagram of an interactive portrait system as a guest approaches an interactive area that includes a display, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to interactive portrait systems and methods for entertainment venues (e.g., theme parks, amusement parks, theaters, movie theaters, stadiums, concert halls). More particularly, the present disclosure relates to an interactive portrait system that provides dynamic, personalized interactions with guests. The interactive portrait system may utilize various techniques to gather information about the guests, such as computer vision to identify characteristics, behaviors, and/or locations of the guests. The interactive portrait system may communicate with devices associated with the guests to obtain identifiers and/or related data, which may indicate characteristics, behaviors, locations, and/or prior achievements of the guests. The interactive portrait system may communicate with one or more sensors to obtain sensor data, which may indicate characteristics, behaviors, and/or locations of the guest. In one embodiment, the interactive portrait system utilizes artificial intelligence (AI) (e.g., machine learning) to assess interests of the guests and/or to control outputs to effectively interact with the guests. For example, the interactive portrait system may utilize AI algorithms to assess imagery to determine that a guest is gazing at a display (e.g., display screen) in a manner that shows sufficient interest (e.g., the guest is likely to engage if presented with the outputs). Then, the interactive portrait system may utilize the AI algorithms to display animations and/or emit sounds based on the characteristics of the guest, the identifier and/or the related data, the behaviors of the guest, the locations of the guest, and/or the prior achievements of the guest. Further, the interactive portrait system may utilize the AI algorithms to carry out a conversational interaction (e.g., to emulate a natural conversation between two humans) with the guest.

As a more specific example, the interactive portrait system may capture image data (e.g., one or more images; imagery) of an environment using one or more cameras. The interactive portrait system may use computer vision to analyze the image data to identify the guest. This may include using computer vision to analyze the image data to identify one or more characteristics of the guest, such as to identify a first guest wearing a red shirt with a first team symbol (e.g., Dragon team). Additionally or alternatively, this may include using computer vision to analyze the image data to identify behaviors of the guest, such as movements of the guest, and/or the location of the guest, such as along a path in the environment. It should be appreciated that the interactive portrait system may additionally or alternatively obtain other types of data, including the identifier obtained via communication with the device carried by the guest and/or the sensor data obtained via the one or more sensors.

The interactive portrait system may process the imagery and/or the other types of data to assess the interest of the guest and to determine whether to attempt to engage the guest. For example, the interactive portrait system may process the imagery and/or the other types of data to identify that the first guest is walking along the path toward an interactive area located proximate to a display(s) (e.g., display screen(s)) and a speaker(s). In response, the interactive portrait system may generate an initial output to attempt to engage and to initiate an interaction with the first guest. The initial output may be consistent across all guests, selected via rotation among available options, selected randomly among the available options, and/or selected from among the available options to be personalized for the first guest based on the characteristics and/or other information about the first guest. For example, the initial output may include displaying a shooting star (e.g., consistent across all guests or otherwise not selected to be personalized for the first guest based on the characteristics and/or other information about the first guest). As another example, the initial output may include displaying a small flickering flame representative of a distant fire-breathing dragon, displaying the first team symbol, and/or emitting sounds directed at the first guest (e.g., "Hey, the Dragon team is my favorite") to provide the initial output to be personalized for the first guest based on the characteristics and/or other information about the first guest.

The interactive portrait system may monitor a response of the first guest (e.g., assess the interest of the first guest during or after the initial output). For example, if the image data indicates that the first guest turns their head toward the interactive area (e.g., toward the display and/or the speaker), then the interactive portrait system may determine that the first guest is sufficiently interested (e.g., engaged) and proceed to provide additional outputs for the first guest. The additional outputs may also be consistent across all guests, selected via rotation among available options, selected randomly among the available options, and/or selected from among the available options to be personalized for the first guest based on the characteristics and/or other information about the first guest. The additional output may be different than the initial output. In an embodiment, the additional outputs may be enhanced compared to the initial output, such as displayed images that are larger (e.g., across more pixels; across a larger surface area of the display), brighter, more colorful, and/or have more movement as compared to the initial output. In this way, the interactive portrait system may attempt to capture the attention of the guests via the initial outputs, and then provide more entertaining, immersive additional outputs once the guests show sufficient interest in engaging with the interactive portrait system.

Once the first guest reaches the interactive area or is otherwise within range of one or more communication devices (e.g., radiofrequency identification readers), the one or more communication devices may detect and/or communicate with a device (e.g., user device) associated with the first user (e.g., a wearable or portable object that is worn or carried by the first user). In this way, the one or more communication devices may receive a first identifier from the device. Then, the interactive portrait system may utilize the first identifier to access data from a database. The data may include various types of information, such as statistics about venues visited by the first guest (e.g., that the first guest completed a ride attraction earlier in the day) and/or other achievements of the first guest. Then, the interactive portrait system may instruct the initial output and/or the additional outputs for the first guest based on the first identifier and/or the data (e.g., "Did you enjoy the ride attraction?"). It should be appreciated that the one or more communication devices may additionally or alternatively receive the data from the device (e.g., from storage on the device). Further, once the first guest provides audible, spoken responses, the interactive portrait system may detect the audible, spoken responses via a microphone(s) and then engage in a conversation with the first guest. As noted herein, the interactive portrait system may utilize AI to determine relevant replies and statements that will emulate a natural conversation (e.g., as if spoken between two humans).

However, if the first guest does not acknowledge or show interest (e.g., sufficient interest, such as does not turn their head toward the interactive area) during or after the initial output, then the interactive portrait system may determine that the first guest does not have an interest in engaging with the interactive portrait system. Then, the interactive portrait system may generate another initial output to attempt to initiate an interaction with a second guest. For example, the interactive portrait system may identify that the second guest is approaching the interactive area and is carrying a drinking cup. As a result, the interactive portrait system may display a character animation that appears to speak and/or emit corresponding sounds directed at the second guest (e.g., "Hey, is your drink good?"). If the image data indicates that the second guest responds with sufficient interest (e.g., turns their head toward the display and/or the speaker), then the interactive portrait system may determine that the second guest is sufficiently interested (e.g., engaged) and proceed to provide additional outputs for the second guest. The interactive portrait system may carry out steps to continue to engage the second guest in the same way set forth above with respect to the first guest.

In one embodiment, the interactive portrait system may generate the initial output(s) (e.g., displayed and/or audible outputs) in response to (e.g., only in response to) determining that the guests are performing certain behaviors and/or showing sufficient interest, such as by the guests approaching the interactive area (e.g., walking toward the display(s), walking past the display(s), being within a threshold distance of the display(s), gazing at the display(s)). For example, when the first guest approaches the interactive area, the interactive portrait system may instruct display of a shooting star or another suitable initial output. Then, when the second guest approaches the interactive area, the interactive portrait system may instruct the display of the shooting star or another suitable initial output, and so on for a third guest, a fourth guest, and the like. In this way, for each guest (or guest group) that performs certain behaviors and/or shows sufficient interest (e.g., for each guest or guest group that approaches the interactive area), the interactive portrait system may provide a suitable initial output to attempt to engage the guest (or guest group). Only some guests (or guest groups) may turn to look at the display(s) and/or otherwise show sufficient signs of interest during and/or after the initial output. However, for each guest (or guest group) that shows sufficient signs of interest during and/or after the initial output, the interactive portrait system may then provide additional outputs to entertain and to interact with the guest (or guest group).

Advantageously, the interactive portrait system may use anonymous characteristics, such as clothing items, personal possessions held by the user, or the like, to carry out a personalized interaction with the guests. Further, the interactive portrait system may use anonymous identifiers, such as achievements within the entertainment venue (e.g., rides completed, teams joined), to carry out the personalized interaction with the guests. Further, the interactive portrait system may use computer vision when the guest is outside of a range of the one or more communication devices and/or sensor(s) (e.g., outside of the interactive area), and then gather additional information via communication with the device carried by the guest when the guest is in the range of the one or more communication devices and/or via the sensor(s) (e.g., in the interactive area). In this way, the interactive portrait system may carry out a multi-stage engagement process to draw the guests toward the interactive area and then to entertain the guests in the interactive area. However, it should be appreciated that a variety of techniques and processes to engage the guests are envisioned.

FIG. 1 is a schematic diagram of an embodiment of an interactive portrait system 10 as a guest 12 (e.g., first guest) approaches an interactive area 14. The interactive portrait system 10 may include a controller 18 with a processor 20 and a memory device 22. The interactive portrait system 10 may also include a communication device(s) 24, a camera(s) 26, a sensor(s) 28, a display(s) 30, and/or a speaker(s) 32, which are communicatively coupled to the controller 18. The interactive area 14 may generally be a region proximate to and/or in front of the display(s) 30. As shown, the guest 12 may travel along a path 34 (e.g., sidewalk) to approach the interactive area 14. The guest 12 may also carry (e.g., wear, hold, travel with) a portable object 40. The portable object 40 may be any suitable type of object, such as a wearable band, jewelry, toy, wand, mobile phone, and the like. However, in one embodiment, to provide additional layers of anonymity and/or to avoid receipt of identifying information by the interactive portrait system 10, the interactive portrait system 10 may not communicate with and/or may not receive identifying information from a mobile phone of the guest 12.

In operation, the camera(s) 26 may capture image data (e.g., one or more images; imagery) within a field of view of the camera(s) 26. The camera(s) 26 may capture the image data from an environment surrounding and/or including the interactive area 14. For example, the image data may include the guest 12 as the guest 12 travels along the path 34 toward the interactive area 14. The controller 18 may receive and process the image data using computer vision techniques to identify one or more characteristics (e.g., attributes) of the guest 12. The one or more characteristics of the guest 12 may be anonymous characteristics, such as a clothing color, a clothing type, a symbol or other print on clothing, accessories worn by the guest, personal possessions carried by the guest, or the like. That is, the one or more characteristics may not include personally identifiable information (PII). The term PII may include information that directly identifies an individual (e.g., name, address, social security number, telephone number) or data elements regarding the individual (e.g., a combination of gender, race, birth date, geographic indicator; facial recognition). Thus, the interactive portrait system 10 may utilize visible context clues, possibly in combination with the identifier from the portable object 40 (e.g., only utilize the visible context clues; or only utilize the visible context clues and the identifier) and/or sensor data from the sensor(s) 28, to initiate and/or to carry out the interaction with the guest 12.

The controller 18 may also process the image data to determine behaviors of the guest 12 and/or a location of the guest 12, such as that the guest 12 is moving toward and/or is positioned within the interactive area 14. In one embodiment, a marker 36 may be drawn onto the ground to mark a boundary of the interactive area 14, and the image data may indicate that the guest 12 is standing within the boundary of the interactive area 14. However, it should be appreciated that the controller 18 may not need the marker 36, but instead may determine that the guest 12 is within the boundary of the interactive area 14 via relative positioning of the guest 12 within the field of view of the camera(s) 26. Thus, the controller 18 may process the image data to determine various behaviors of the guest 12 (e.g., movement, such as walking movement, gestures, mouth movement), gaze direction, facial expressions, sentiment, and/or other behaviors of the guest 12. Indeed, the controller 18 may utilize AI algorithms to process the image data to determine whether the guest 12 shows signs of sufficient interest in the interactive area 14 (e.g., before the initial output; to trigger the initial output). For example, certain movements or combinations of movements/sounds (e.g., behaviors; gazing at the interactive area 14 for more than a threshold period of time, such as 3 seconds) may indicate sufficient interest in the interactive area 14 that indicates that the guest 12 is likely to engage (e.g., respond, interact) if presented with an initial output.

In one embodiment, the communication device(s) 24 may communicate with a respective communication device 38 of the portable object 40. For example, the communication device(s) 24 may be a radiofrequency identification (RFID) reader(s) that is configured to communicate with (e.g., read) a RFID tag of the portable object 40. As another example, the communication device(s) 24 may be a transceiver(s) that is configured to communicate with a respective transceiver(s) of the portable object 40 via any suitable wireless protocol (e.g., Bluetooth). In such cases, a strength of the signal received at the communication device(s) 24 and/or triangulation techniques (e.g., based on signals received by multiple communication devices 24) may indicate a location of the guest 12 relative to the interactive area 14. Additionally or alternatively, the communication device(s) 24 may receive an identifier (e.g., a unique identifier) from the RFID tag and/or a storage of the portable object. In such cases, the communication device(s) 24 may provide the identifier to the controller 18, which may then use the identifier to access data from one or more databases 42. The data may include achievements associated with portable object 40. For example, the guest 12 may carry the portable object 40 to each ride attraction in the entertainment venue, and a respective achievement is stored in the database 42 in association with the identifier upon completion of each ride attraction. In some cases, the data may include information about the guest 12 and/or preferences of the guest 12, such as a team and/or preferred animations. It should be appreciated that the communication device(s) 24 may additionally or alternatively receive the data from the portable object 40 (e.g., from the storage on the portable object). Further, in one embodiment, the sensor(s) 28 (e.g., proximity sensors, pressure/weight sensors, temperature sensors, optical sensors) may detect the location of the guest 12 relative to the interactive area 14 and/or behaviors of the guest 12. The sensor(s) 28 may also include a microphone to detect audible inputs from the guest 12 (e.g., spoken words or phrases).

Thus, the controller 18 may analyze the image data, the communication, the sensor data, and/or other data to determine the characteristics of the guest, the behaviors of the guest, the location of the guest 12 relative to the interactive area 14, and/or the prior achievements of the guest 12. In response to the guest 12 showing sufficient interest, such as by approaching the interactive area 14 (e.g., walking toward; being in proximity of and/or within the interactive area 14), the controller 18 may generate one or more initial outputs to provide an experience to the guest 12. For example, the controller 18 may instruct the display(s) 30 and/or the speaker(s) 32 to provide the initial output to attempt to initiate an interaction with the guest 12. In FIG. 1, the initial output is shown as a shooting star 46, which may draw additional attention when presented in a display that appears to be a painting. The initial output may be the same for all guests, selected via rotation among available options, selected randomly among the available options, and/or selected from among the available options to be personalized for the guest 12. For example, the initial output may include displaying the shooting star (e.g., the same for all guests or otherwise not selected to be personalized for the guest 12). As another example, the initial output may include displaying a small flickering flame due to the one or more characteristics indicating that the guest 12 likes fire-breathing dragons (e.g., print on a shirt of the guest 12). Additionally or alternatively, the initial output may include emitting sounds directed at the guest 12 (e.g., whispering "Hello" or "Hey, do you like dragons?").

The controller 18 may continue to analyze the image data, the communication, the sensor data, and/or other data to determine whether the guest 12 shows sufficient interest during and/or after the initial output (e.g., whether the guest 12 responds to the initial output). For example, the controller 18 may determine that the guest 12 responds to the initial output if the image data, the communication, the sensor data, and/or the other data indicates that the guest 12 turned their head toward the display(s) 30 and/or the speaker(s) 32, the guest 12 walked toward the display(s) 30 and/or the speaker(s) 32, the guest 12 stops walking and stays within the interactive area 14. The controller 18 may utilize AI algorithms to determine whether the guest 12 responds to the initial output. For example, certain movements or combinations of movements/sounds (e.g., behaviors; turned their head for more than a threshold time, such as three seconds, and said "What is that?") may indicate sufficient interest and show that the guest 12 is likely to continue engagement if presented with additional outputs.

If the controller 18 determines that the guest 12 responds to the initial output, the controller 18 may determine that the guest 12 is engaged and proceed to provide the additional outputs for the guest 12. The additional outputs may be the same across all guests, selected via rotation among available options, selected randomly among the available options, and/or selected from among the available options to be personalized for the guest 12. The additional outputs may be different than the initial output. In an embodiment, the additional outputs may be enhanced compared to the initial output, such as displayed images that are larger (e.g., across more pixels; across a larger surface area of the display(s) 30), brighter, more colorful, and/or have more movement as compared to the initial output. For example, the initial output may include a small flickering lighting strike, and the additional outputs may include several larger lightning strikes (e.g., same type of object, but different sizes). As another example, the initial output may include a small flickering flame, and the additional outputs may include a fire-throwing monster (e.g., different types of objects/characters). As another example, the initial output may include a whisper or a quieter (e.g., lower volume) sound, and the additional outputs may include a shout or a higher volume sound. In this way, the interactive portrait system may attempt to capture the attention of the guest 12 via the initial output (e.g., a low-level activation state), and then provide more entertaining, immersive additional outputs (e.g., a high-level activation state) once the guest 12 responds to the initial output to show sufficient interest in interacting with the interactive portrait system 10. The interactive portrait system 10 may utilize AI algorithms that are trained to identify or to pick out signs of interest, such as the guest 12 gazing at the display(s) 30 for more than the threshold time and/or pausing in front of the display(s) 30 for the threshold time. The AI algorithms may be trained to receive several pieces of information (e.g., gaze, gait, motion, lack of motion, speech, and/or other behaviors) to identify the signs of interest and to assess the signs of interest, which may then prompt the controller 18 to select the guest 12, provide the initial output to the guest 12, and/or provide the additional outputs to the guest 12. The AI algorithms may be trained to identify sufficient interest to trigger the initial output and/or sufficient interest to trigger the additional outputs. The AI algorithms may be different and/or a level of interest that is considered to be sufficient interest may vary (e.g., approaching the display(s) 30 is considered sufficient interest to trigger the initial output, but is not sufficient interest to trigger the additional outputs; instead, gazing at the display(s) 30 for more than a threshold period of time and providing a detectable audible response to the initial output is considered sufficient to trigger the additional outputs).

It should be appreciated that various processes and manners of engagement with the guest 12 are envisioned. For example, the initial output may be provided to the guest 12 as the guest 12 travels near the interactive area 14 and/or is positioned within the interactive area 14. In some cases, the initial output may be provided periodically (e.g., according to a schedule) and/or responsively (e.g., in response to the guest 12 being in a particular location relative to the interactive area 14; in response to the guest 12 behaving in a particular manner). The initial output may be provided while the guest 12 gazes at the display(s) 30 or while the guest 12 does not gaze at the display(s) 30. In one embodiment, the display(s) 30 may be initially blank (e.g., not illuminated or illuminated to be a uniform color). Then, as the guest 12 travels toward the display(s) 30 and/or gazes at the display(s) 30, the controller 18 may instruct the display(s) 30 to display an image of a flickering flame or other animation. The controller 18 may time the display of the image so that the image appears in a field of view of the guest 12 as the guest 12 travels past the display(s) 30 and/or as the guest 12 gazes at the display(s) 30. For example, if the image data indicates that the guest 12 is walking along a sidewalk that passes in front of the display(s) 30, the controller may time the display of the image so that the image appears as the guest 12 reaches a forward edge portion of the display(s) 30 and/or while the guest 12 is directly in front of the display(s) 30. As another example, if the image data indicates that the guest 12 is turning their head and their gaze from left to right to scan the environment, the controller 18 may time the display of the image so that the image appears as the guest 12 faces toward the display(s) 30. As another example, if the image date indicates that the guest 12 is looking at the display(s) 30, the controller 18 may instruct immediate (e.g., without delay, as quickly as possible) display of the image so that the image appears as the guest 12 looks toward the display(s) 30.

In one embodiment, the display(s) 30 may display a stationary scene (e.g., an interior of a store to make the display(s) 30 appear to be a window of a store or other building). Then, as the guest 12 travels toward the display(s) 30 and/or gazes at the display(s) 30, the controller 18 may instruct the display(s) 30 to display an image of a moving animation in the stationary scene (e.g., a flickering flame in a fireplace in the stationary scene). The controller 18 may time the display of the image so that the image appears in the field of view of the guest 12 as the guest 12 travels past the display(s) 30 and/or as the guest 12 gazes at the display(s) 30.

In one embodiment, the display(s) 30 may display multiple animation characters (e.g., a robot and a princess) engaged in a conversation with one another. Then, as the guest 12 travels toward the display(s) 30 and/or gazes at the display(s) 30, the controller 18 may instruct the display(s) 30 to adjust the multiple animation characters, such as to stop the conversation with one another, turn toward the guest 12, appear to speak about the one or more characteristics of the guest 12 (e.g., the princess appears to say "I like your giraffe shirt.") The controller 18 may time the changes so that the image appears in the field of view as the guest 12 travels past the display(s) 30 and/or as the guest 12 gazes at the display(s) 30. It should be appreciated that the AI algorithms may be trained on various data indicative of guest behavior, including movement, gaze, and so forth, to evaluate the interest of the guest 12 and to provide the outputs in response to detecting sufficient interest of the guest 12.

In one embodiment, the initial output may be enhanced relative to the additional outputs to facilitate grabbing the attention of the guest 12. In one embodiment, the additional outputs and the initial output may not be enhanced relative to one another. Instead, the additional outputs and the initial output may be any suitable animations and/or sounds that form part of a storyline and/or interaction with the guest 12. The display(s) 30 may be surrounded by a frame (e.g., bezel) to appear like a framed window, a framed doorway, or the like. Further, the display(s) 30 may be textured to appear to be a painting (e.g., an oil painting).

Figure 2:
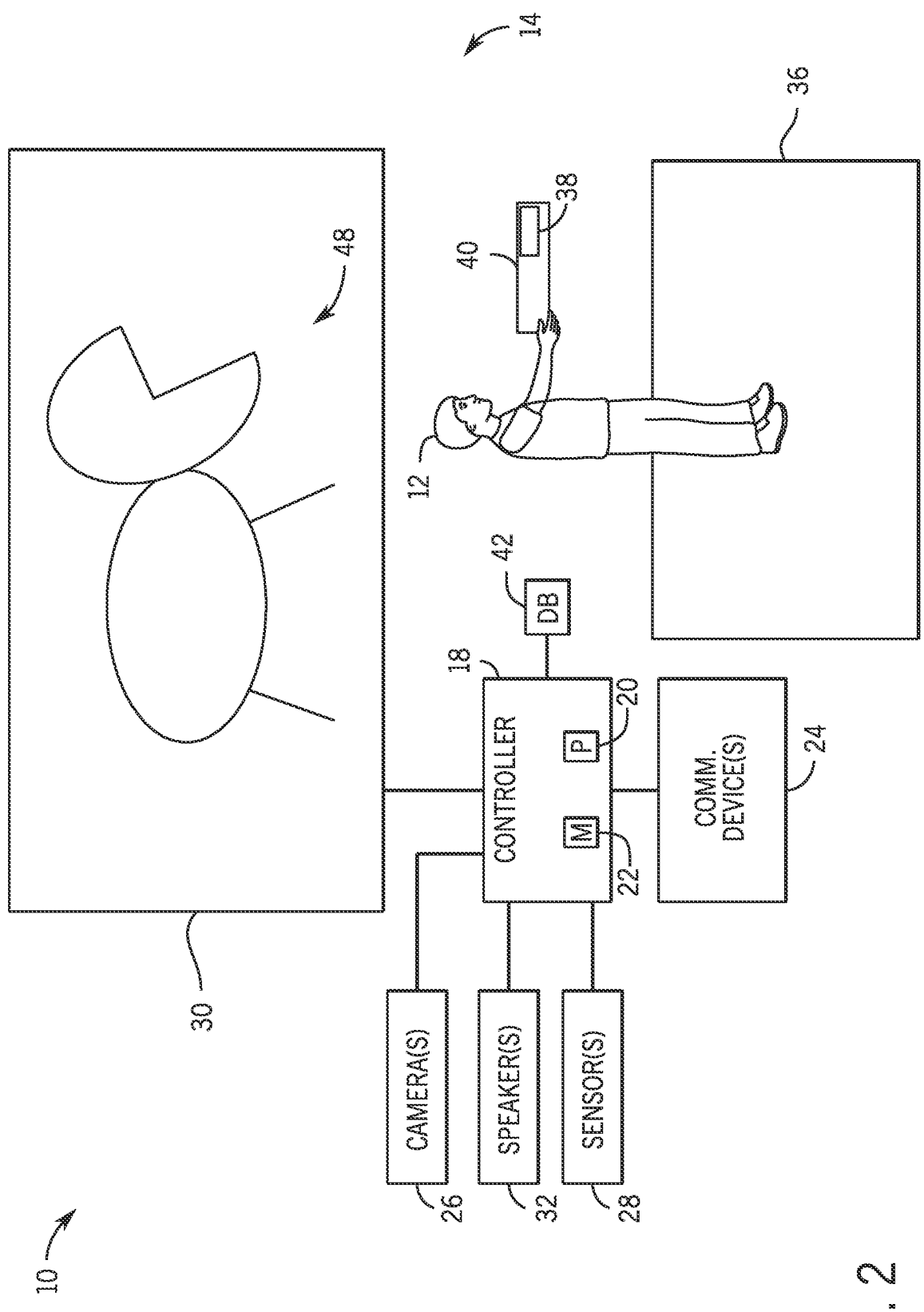
FIG. 2 is a schematic diagram of the interactive portrait system of FIG. 1 while the guest is located in the interactive area to interact with an animation presented on the display, in accordance with an aspect of the present disclosure.

FIG. 2 is a schematic diagram of an embodiment of the interactive portrait system 10 while the guest 12 is located in the interactive area 14 (e.g., proximate to or in front of the display(s) 30). As shown, the additional outputs are presented on the display(s) 30, and the additional outputs include an animation 48 (e.g., character animation). Once the guest 12 is engaged in an interaction with the interactive portrait system 10 (e.g., as determined by the AI algorithms; sufficient interest in response to the initial output; as evidenced by gazing at the display(s) 30, gesturing toward the display(s) 30, changing from a moving gait to a stationary position in front of the display(s) 30, and/or providing audible, spoken words or phrases directed at the animations on the display(s) 30 and/or made in reply to prompts emitted via the speaker(s) 32) the controller 18 may carry out additional interactive aspects. In one embodiment, the controller 18 may process multiple data inputs and provide appropriate animations and/or sounds to continue the interaction. For example, the controller 18 may use AI to generate animations to be output by the display(s) 30 and corresponding prompts to be output by the speaker(s) 32 (e.g., to make it appear as if the animations are speaking the corresponding prompts) that emulate a natural conversation with the guest 12 (e.g., as if spoken between two humans).

Further, the controller 18 may use the data collected via the communication device(s) 24, the camera(s) 26, and/or the sensor(s) 28 to select the animations and the corresponding prompts to be responsive to and/or personalized for the guest 12. For example, the communication device(s) 24 may access the identifier, which can be used to retrieve achievements associated with the portable object 40 carried by the guest 12. The communication device(s) 24, the camera(s) 26, and/or the sensor(s) may monitor the behaviors (e.g., movements, facial expressions) of the guest 12 during the interaction with the interactive portrait system 10. Further, the sensor(s) 28 may include the microphone(s) that detect the spoken inputs from the guest 12. In this way, multiple inputs may be received over time (e.g., continuously) as the guest 12 interacts with the animation on the display(s) 30, and the multiple inputs are processed by the controller 18 (e.g., using AI) to enable the controller 18 to respond appropriately, such as to provide targeted prompts and/or to provide the effect of the natural conversation with the guest 12.

As noted herein and with reference to FIG. 1, if the guest 12 travels toward the interactive area 14 or is otherwise selected for engagement by the controller 18, the controller 18 may provide the initial output. If the guest 12 responds, the controller 18 may then provide the additional outputs to carry out the dynamic interaction with the guest 12. However, if the guest 12 does not respond (e.g., does not show sufficient interest, which may be determined via the AI algorithms), the controller 18 may either try again (e.g., with another initial output for the guest 12) or select an additional guest 44. For example, the controller 18 may analyze the image data to identify the additional guest 44 approaching the interactive area 14. The controller 18 may then provide the initial output as described herein, such as with certain timing, based on one or more respective characteristics of the additional guest 44, and/or other features. The controller 18 may continue to attempt to engage different guests in this way until one of the different guests responds to their initial output and begins to interact with the interactive portrait system 10.

The interactive portrait system 10 disclosed herein provides a possibly unexpected interactive experience for the guest 12 (e.g., appearing on a faux window of a retail store as the guest 12 travels along the path 34). The interactive experience may be initiated based on the image data captured by the camera(s) 26 and/or other data collected via the communication device(s) 24 and/or the sensor(s) 28. The interactive experience may be initiated by the guest 12 simply performing one or more of the following: approaching the interactive area 14, changing their gaze to survey the environment, and/or speaking certain words or phrases within range of the sensor(s) 28. The interactive experience may be initiated without the guest 12 providing any keyed inputs (e.g., without flipping a switch or pushing a push-button). This may provide efficient processing and computer operation to provide a responsive, realistic interaction with the guest 12. Indeed, the interactive experience may be initiated in an entirely passive manner (e.g., from the perspective of the guest 12) by the guest 12 simply approaching the interactive area 14 without directing their gaze toward the display(s) 30, without speaking, and/or without providing any keyed inputs. The interactive experience may continue (with at least one additional output) by the guest 12 simply indicating sufficient interest in the initial output (e.g., a response to the initial output), such as by the guest 12 slowing their gait as they pass in front of the display(s) 30, changing their gaze to look at the display(s) 30, speaking certain words or phrases that are determined to relate to the initial input within range of the sensor(s) 28, and/or without providing any keyed inputs. Thereafter, continued engagement and interaction may depend on the behavior of the guest 12, such as the location of the guest 12, the movement of the guest 12, the gestures made by the guest 12, the gaze of the guest 12, the spoken words or phrases from the guest 12, and so forth. For example, the engagement and interaction may continue with the guest 12 as long as the guest 12 remains engaged/responds, for some period of time (e.g., a set period of time, such as not to exceed 5 minutes), and/or until other guests approach the interactive area 14.

In one embodiment, the guest 12 may travel in the environment around the interactive area 14, but outside of a range(s) of the communication device(s) 24 and/or the sensor(s) 28. Thus, the controller 18 may have the image data, but not any additional data about the guest 12 from the communication device(s) 24 and/or the sensor(s) 28. In such cases, the controller 18 may use the information derived from the image data to generate the initial output to entice the guest 12 to move into the range(s) of the communication device(s) 24 and/or the sensor(s) 28. Then, once the guest 12 is in the range(s), the controller 18 may use the information derived from the communication device(s) 24 and/or the sensor(s) 28 to carry out continued dynamic interactions with the guest 12 (e.g., personalized conversations). In this way, the interactive portrait system 10 may use the image data to track the guest 12 and to attempt to engage the guest 12 until the guest 12 and/or the portable object 40 are within the range(s) of the communication device(s) 24 and/or the sensor(s) 28. It should be appreciated that the image data may also be used in addition to the data from the communication device(s) 24 and/or the sensor(s) 28 to carry out the continued dynamic interactions with the guest.

Further, once the guest 12 is in the range(s), the controller 18 may instruct the display(s) 30 and/or the speaker(s) 32 to provide task(s) (e.g., "Perform five jumping jacks" or "Copy the robot's dance moves") for the guest 12 to complete to collect an achievement, which may be stored in the database 42 in association with the identifier. The controller 18 may analyze the image data from the camera(s) 26 and/or the other data from the communication device(s) 24 and/or the sensor(s) 28 to determine whether the guest 12 successfully completed the task(s). For example, the sensor(s) 28 may include a light detector that tracks movement of a light emitter on the portable object 40 to track gestures/movements (e.g., waving movements; pointing) made with the portable object 40. As another example, the sensor(s) 28 may include a light emitter/detector pair that emits light and detects the light after it is reflected by the portable object 40 to track gestures/movements made with the portable object 40. The controller 18 may match the gestures/movements to target gestures/movements, which may be stored and accessible from the database 42, to determine whether the guest 12 successfully completed the task(s).

In one embodiment, the controller 18 may apply AI algorithms that are trained on multiple sample sets of gestures/movements. Further, the AI algorithms may be trained on diverse sample sets and/or have added fuzziness to lower a barrier for certain guests (e.g., children) who may have trouble accurately performing the target gestures/movements. In certain embodiments, the controller 18 may use the one or more characteristics identified via the image data and/or the other data (e.g., the data stored in associated with the identifier; the sensor data from the one or more sensor(s) 28) to determine whether to apply the fuzziness and/or to adjust the fuzziness. For example, if any of the data suggests that the guest 12 is a child, the controller 18 may provide this as an input to the AI algorithms and/or add the fuzziness so that this is accounted for in assessing the gestures/movements.

The processor 20 may include a microprocessor, which may execute software to control the display(s) 30, the speaker(s) 32, and/or other features of the interactive portrait system 10. The processor 20 may include multiple microprocessors, one or more "general-purpose" microprocessors, one or more special-purpose microprocessors, and/or one or more application specific integrated circuits (ASICs), or some combination thereof. For example, the processor 20 may include one or more reduced instruction set computer (RISC) processors. The memory device 22 may include volatile memory, such as random access memory (RAM), and/or nonvolatile memory, such as read-only memory (ROM). The memory device 22 may store information, such as control software, look up tables, configuration data, communication protocols, or the like.

For example, the memory device 22 may store processor-executable instructions including firmware or software for the processor 20 to execute, such as instructions for generating derivatives, controlling the display(s) 30, the speaker(s) 32, and/or other features of the interactive portrait system 10. In an embodiment, the memory device 22 is a tangible, non-transitory, machine-readable media that may store machine-readable instructions for the processor 20 to execute. The memory device 22 may include ROM, flash memory, hard drives, any other suitable optical, magnetic, or solid-state storage media, or a combination thereof. The communication device(s) 24 may facilitate communication (e.g., wireless communication) with other components, such as the portable objects 40, the database 42, and so forth. The display(s) 30 may be any suitable type of display, such as a projection screen (e.g., illuminated via light projected by a projector), a liquid crystal display (LCD), an organic light emitting diode display (OLED), and so forth. Such displays may include coatings or filters that make imagery presented on the display look like paintings (e.g., oil paintings, watercolors).

Figure 3:
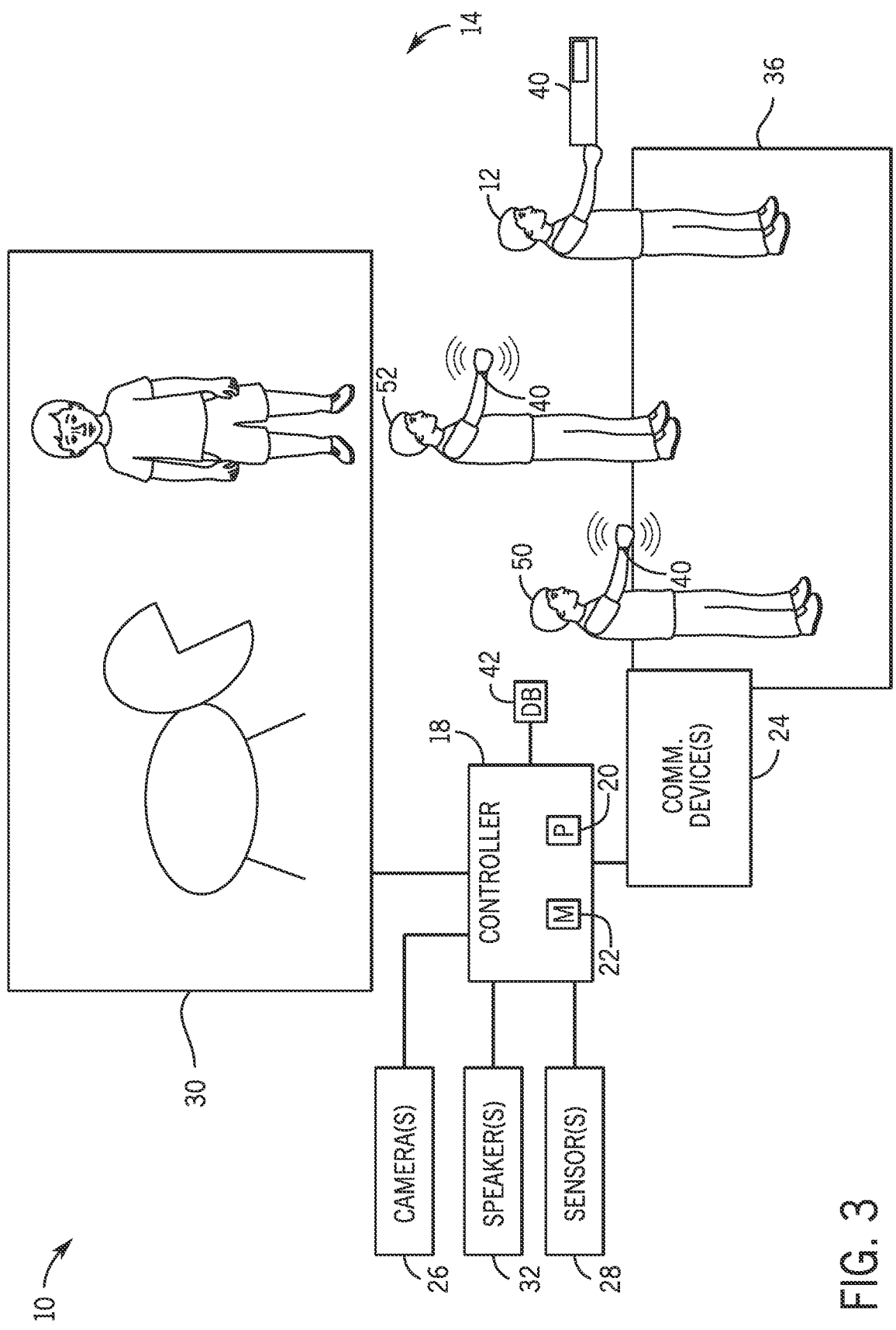
FIG. 3 is a schematic diagram of the interactive portrait system of FIG. 1 while multiple guests are located in the interactive area to interact with the animation presented on the display, in accordance with an aspect of the present disclosure.

FIG. 3 is a schematic diagram of an embodiment of the interactive portrait system 10 while multiple guests are located in the interactive area 14 to interact with the animation presented on the display(s) 30. The multiple guests include the first guest 12, a second guest 50, and a third guest 52. The controller 18 may identify that the multiple guests are in the interactive area 14 and may selectively engage the multiple guests to carry out a dynamic conversation (e.g., AI-driven conversation) with the multiple guests either sequentially (e.g., have a complete conversation with the first guest 12, then a complete conversation with the second guest 50, and so on) and/or as a group (e.g., dynamically respond to the multiple guests based on respective behaviors of the multiple guests). For example, the controller 18 may select the first guest 12 (e.g., as a current primary participant) and identify that the first guest 12 is wearing a shirt with a monster symbol. Then, the controller 18 may attempt to initiate conversation with the first guest 12 by displaying the animation to appear to look at the first guest 12 and emitting corresponding sounds that include prompts related to monsters. If the first guest 12 responds, as evidenced by their behaviors, the controller 18 may continue to respond to carry out the conversation with the first guest 12. Then, at some later time (e.g., after a set time, such as five minutes; once the first guest 12 loses interest, such as walks away; once the second guest 50 shows interest, such as responds to a prompt), the controller 18 may select the second guest 50 (e.g., as the current primary participant) and identify that the second guest 50 is carrying a drink. Then, the controller 18 may attempt to initiate conversation with the second guest 50 by displaying the animation to appear to look at the second guest 50 and emitting corresponding sounds that include prompts related to drinks. If the second guest 50 responds, as evidenced by their behaviors, the controller 18 may continue to respond to carry out the conversation with the second guest 50. The controller 18 may continue in this way as long as there are additional guests waiting to have a turn to interact with the interactive portrait system 10.

As noted herein, the controller 18 may address the multiple guests as a group, also permitting new guests to join the group and/or other guests to leave the group. Thus, the group may change over time. In such cases, the controller 18 may identify the one or more respective characteristics, the respective identifier, and/or other respective data related to the first guest 12 and the second guest 50. Then, the controller 18 may attempt to initiate conversation with both the first guest 12 and the second guest 50 as a group, such as by displaying the animation to appear to look at the first guest 12 and emitting corresponding sounds that include prompts related to monsters. Then, the controller 18 may determine that the second guest 50 has responded to one of the prompts, so the controller 18 may then display the animation to appear to look at the second guest 50 and emit corresponding sounds that include prompts related to drinks. The controller 18 may receive several types of data to effectively switch back and forth to address different guests in the group over time to carry out an engaging, dynamic interaction with the multiple guests.

The controller 18 may adjust the interaction based on a number of guests in the group, such as by speaking fewer words per prompt, fewer words to each guest, shorter prompts to each guest, fewer prompts to each guest, spending less time engaging with each guest, or the like when the number of guests in the group exceeds a threshold number (e.g., more than 2, 3, 4, 5, 10, 15, or 20 guests). Similarly, the controller 18 may adjust the interaction by speaking more words per prompt, more words to each guest, longer prompts to each guest, more prompts to each guest, spending more time engaging with each guest, or the like when the number of guests in the group is less than the threshold number. The number of words and/or the length may also vary dynamically (e.g., on a sliding scale; according to a curve) based on the number of guests in the group. This may enable the controller 18 to impact and/or implement crowd control measures through the dynamic interactions.

The interactive portrait system 10 may be configured to carry out other techniques in crowded situations. For example, in a crowd, it may be difficult to accurately associate each of the multiple guests with their portable object 40. In one embodiment, the controller 18 may be able to associate at least some of the multiple guests to their portable object 40 by collecting all identifiers of the portable objects 40 in the crowd, accessing the database 42 to gather all achievements associated with the portable objects 40 in the crowd, and then selecting one of the achievements to call out. For example, the controller 18 may determine that one guest recently completed a ride attraction, and may instruct the speaker(s) 32 to emit a related prompt (e.g., "Which one of you completed the ride attraction?") and the display(s) 30 to animate the character animation to appear as if it is speaking the prompt. Then, the image data captured by the camera(s) 26 may reveal the guest that responds (e.g., by raising their hand or moving their mouth to speak). The sensor data captured by the sensor(s) 28 (e.g., directional microphone) may also reveal the guest that responds (e.g., by speaking). Thus, the image data and/or the sensor data may reveal the guest that responds, and the controller 18 may then use the image data and/or the sensor data to identify the location of the guest, the guest, and/or the one or more characteristics of the guest. The controller 18 may then control the display(s) 30 and the speaker(s) 32 to carry out a conversation with the guest (e.g., the character animation turns toward the guest and appears to speak the prompt emitted by the speaker(s) 32, such as "Ok. I like the monster on your shirt."). At some later time, the controller 18 may select another achievement associated with a different portable object 40 to attempt to initiate an interaction with another guest, and so on. In any case, the interactions may be AI-driven to be dynamic and responsive to the guests, which may provide enjoyable and natural interactions for the guests.

Figure 4:
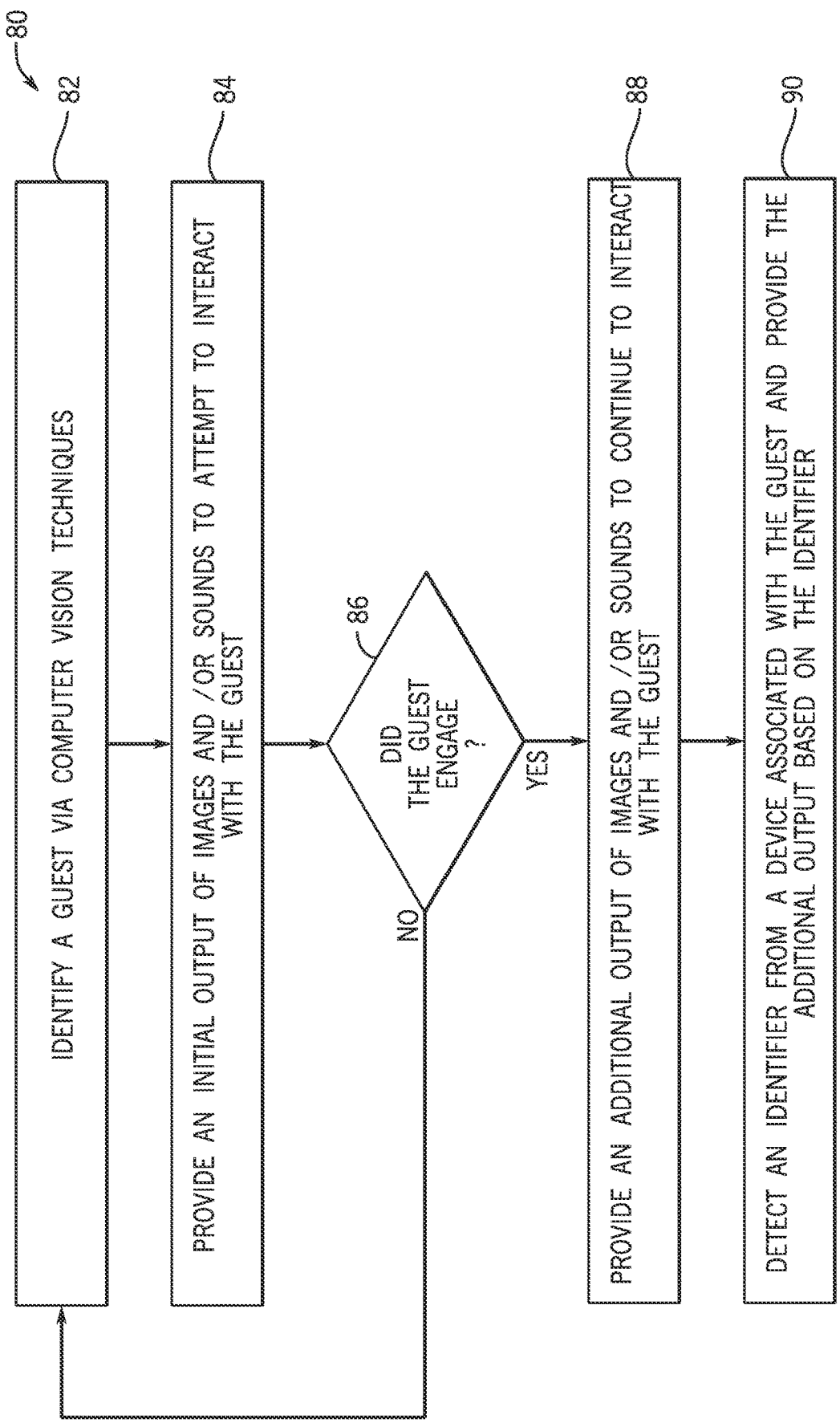
FIG. 4 is a flow diagram of a method of operating the interactive portrait system of FIG. 1, in accordance with an aspect of the present disclosure.

FIG. 4 is a flow diagram of an embodiment of a method 80 of operating the interactive portrait system 10. The method 80 includes various steps represented by blocks. It should be noted that the method 80 may be performed as an automated procedure by a system, such as the interactive portrait system. Although the flow chart illustrates the steps in a certain sequence, it should be understood that the steps may be performed in any suitable order and certain steps may be carried out simultaneously, where appropriate. Further, certain steps or portions of the method 80 may be performed by separate systems or devices.

In block 82, the method 80 may begin by identifying a guest (e.g., a potential user of the interactive portrait system). For example, image data captured by camera(s) may include the guest, and a controller may analyze the image data to identify one or more characteristics of the guest. The field(s) of view of the camera(s) may be set to capture an interactive area in front of a display(s) and/or an environment surrounding the interactive area. In this way, the image data may include the guest as the guest approaches the interactive area and/or as the guest interacts with media on the display(s), for example.

In block 84, the method 80 may continue with instructing an initial output of images (e.g., animations) via the display(s) and/or sounds via speaker(s) to attempt to interact with the guest. As set forth herein, the initial output may be intended to provide some visual and/or audible effect to capture the attention of the guest. The initial output may be the same for all guests, selected via rotation among available options, selected randomly among the available options, and/or selected from among the available options to be personalized for the guest. For example, the initial output may include displaying a shooting star (e.g., the same for all guests or otherwise not selected to be personalized for the guest). As another example, the initial output may include displaying a small flickering flame due to the one or more characteristics indicating that the guest likes fire-breathing dragons (e.g., print on a shirt of the guest). Additionally or alternatively, the initial output may include emitting sounds directed at the guest (e.g., whispering "Hello" or "Hey, do you like dragons?"). The initial output may be provided in response to the controller determining that the guest shows sufficient interest (e.g., approaching the interactive area and/or gazing at the display(s)). The controller may utilize AI algorithms to determine that the guest shows sufficient interest.

In block 86, the method 80 may continue to analyze the image data and/or other data (e.g., communication data generated by a communication device(s) connecting with a portable object carried by the guest; sensor data generated by sensor(s) about the interactive area) to determine whether the guest shows sufficient interest in (e.g., responded to; engaged with) the initial output. For example, the controller may determine that the guest responded to the initial output if the image data and/or the other data indicates that the guest turned their head toward the display(s) and/or the speaker(s), the guest walked toward the display(s) and/or the speaker(s), the guest speaks certain words or phrases that indicate engagement or interest (e.g., "What was that?" or "Let's go see the flame"), and/or the guest stops walking and stays within the interactive area. The controller may utilize AI algorithms to determine that the guest responded to the initial output.

If the guest is engaged, the method 80 may continue to block 88. In block 88, the method 80 may include instructing an additional output of images via the display(s) and/or sounds via speaker(s) to continue the interaction with the guest. The additional output may be the same across all guests, selected via rotation among available options, selected randomly among the available options, and/or selected from among the available options to be personalized for the guest. The additional output may be different than the initial output. In an embodiment, the additional output may be enhanced compared to the initial output, such as displayed images that are larger, brighter, more colorful, and/or have more movement as compared to the initial output. In this way, the interactive portrait system may attempt to capture the attention of the guest via the initial output, and then provide more entertaining, immersive additional outputs once the guest shows interest in engaging with the interactive portrait system. This may provide efficient processing and computer operations (e.g., by reserving computer resources and substantial processing in response to the guest engaging with the interactive portrait system).

If the guest is within range of the communication device(s) and if the guest has their own portable object, the method 80 may continue to block 90. In block 90, the method 80 may detect an identifier and/or otherwise obtain data via communication with the portable object carried by the guest. For example, the controller may be coupled to an RFID reader that is configured to read the identifier from an RFID tag of the portable object. Then, the controller can use the identifier to access achievements stored in association with the identifier in a database. Additionally, in one embodiment, the controller may instruct the additional outputs of the images via the display(s) and/or the sounds via speaker(s) to continue to interact with the guest based on the identifier and/or the data accessed via communication with the portable object carried by the guest. It should be appreciated that the interactive portrait system may also include sensor(s), and the controller may provide the outputs based on sensor data from the sensor(s). As noted herein, the interactive portrait system may switch between different guests to provide interactions with the different guests (e.g., based on the image data, the one or more characteristics of the guests, the identifiers associated with the guests, the sensor data related to the guests; AI-driven interactions).

The interactive portrait system may include and/or activate any of a variety of show effects, such as show effects other than the display(s) and/or the speaker(s). For example, the show effects may include light emitters that emit light to illuminate an area (e.g., a room), haptic devices that output haptic effects (e.g., vibrations, air flow, including a cool and/or a warm air flow), torches that output flames (e.g., hot flames), and so forth. In an embodiment, the interactive portrait system may utilize AI to respond and/or to implement the show effects. For example, the interactive portrait system may determine that the guest put on a winter coat and that the guest is likely cold, and then, activate the haptic device to provide the warm air flow and/or the torches to output the flames to warm the guest. Such show effects may also correspond to the images on the display(s) and/or the sounds from the speaker(s), so as to provide a consistent story and experience to the guest (e.g., the flames on the display(s) may be accompanied by the warm air flow).

The interactive portrait system may enable improved guest interaction with a show attraction at an entertainment venue. It should be appreciated that the interactive portrait system may be modular and may be transported to different show attractions and/or different locations in the entertainment venue. Indeed, the interactive portrait system may be coupled to a movable robot (e.g., autonomously controlled to travel around the entertainment venue or remotely controlled by an operator). In such cases, the movable robot may include the display(s), the speaker(s), the camera(s), the sensor(s), the communication device(s), and/or the controller (which may be part of or communicate with a remote computing system, such as a cloud computing system or a central computing system, to facilitate processing steps and/or access to the database). The movable robot may roam around the entertainment venue and carry out the techniques disclosed herein to interact with guests (e.g., as the guests approach the movable robot). However, the movable robot may also move relative to the guests (e.g., toward the guests), such as to bring the guests within range of the communication device(s) and/or the sensors(s), for example.

It should also be appreciated that the interaction may be carried out under the guidance of AI; however, the outputs may be provided via the display(s) and/or the speaker(s) for an operator (e.g., real person, cast member) to guide the operator to speak with the guest. Thus, the interactive portrait system may use AI to determine an interest level of the guest and/or to determine appropriate outputs that are likely to be of interest to the guest. However, the interactive portrait system may provide instructions to the operator to speak the appropriate outputs to the guest. In one embodiment, the interaction may begin under the guidance of AI (e.g., the initial output and/or a few outputs) via the outputs provided via the display(s) and/or the speaker(s) to the operator, and then the operator may continue the interaction without the guidance of the AI. Similarly, in one embodiment, the interaction may be carried out via AI-driven interactions via the display(s) and/or the speaker(s) for the guest, and the operator may monitor the outputs and/or be able to intervene (e.g., select outputs, block outputs) during the interaction.

In one embodiment, such as during availability of particular known examples that correlate to future predictions, supervised AI/machine learning may be implemented. In supervised AI/machine learning, the mathematical model of a set of data contains both the inputs and the desired outputs. This data is referred to as "training data" and is essentially a set of training examples. Each training example has one or more inputs and the desired output, also known as a supervisory signal. In the mathematical model, each training example is represented by an array or vector, sometimes called a feature vector, and the training data is represented by a matrix. Through iterative optimization of an objective function, supervised learning algorithms learn a function that can be used to predict the output associated with new inputs. An optimal function will allow the algorithm to correctly determine the output for inputs that were not a part of the training data. An algorithm that improves the accuracy of its outputs or predictions over time is said to have learned to perform that task. Supervised learning algorithms include classification and regression. Classification algorithms are used when the outputs are restricted to a limited set of values, and regression algorithms are used when the outputs may have any numerical value within a range. Further, similarity learning is an area of supervised machine learning closely related to regression and classification, but the goal is to learn from examples using a similarity function that determines the extent in which two objects are similar or related.

Additionally and/or alternatively, in some situations, it may be beneficial to utilize unsupervised learning (e.g., when particular output types are not known). Unsupervised learning algorithms take a set of data that contains only inputs and find structure in the data, such as grouping or clustering of data points. The algorithms, therefore, learn from test data that has not been labeled, classified, or categorized. Instead of responding to feedback, unsupervised learning algorithms identify commonalities in the data and react based on the presence or absence of such commonalities in each new piece of data. In any case, AI (e.g., machine learning) may be used to identify signs of interest from the guests, as well as to determine appropriate outputs to engage the guests to provide dynamic, personalized interactions for the guests.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive portrait system, comprising:
a camera configured to capture imagery of an environment; and
a controller configured to:
analyze the imagery to identify a guest in the environment;
instruct an output device to provide an initial output to attempt to interact with the guest;
analyze the imagery to identify a behavior of the guest during the initial output, after the initial output, or both;
evaluate the behavior of the guest using one or more artificial intelligence algorithms to determine whether the guest responded to the initial output;
in response to determining that the guest responded to the initial output, instruct the output device to provide an additional output to continue to attempt to interact with the guest; and
in response to determining that the guest failed to respond to the initial output:
block the output device from providing the additional output;
analyze the imagery to identify an additional guest in the environment; and
instruct the output device to provide a respective initial output to attempt to interact with the additional guest.

2. The interactive portrait system of claim 1, wherein the initial output comprises a first animation of a first type of object or character, and the additional output comprises a second animation of a second type of object or character that is different from the first type of object or character.

3. The interactive portrait system of claim 1, wherein the initial output comprises a first animation, the additional output comprises a second animation, and the second animation is larger than the first animation.

4. The interactive portrait system of claim 1, wherein the initial output comprises a first sound, the additional output comprises a second sound, and the first sound has a lower volume than the second sound.

5. The interactive portrait system of claim 1, wherein the controller is configured to analyze the imagery to identify one or more characteristics of the guest, and the initial output, the additional output, or both are based on the one or more characteristics of the guest.

6. The interactive portrait system of claim 1, wherein the behavior comprises the guest turning their head toward the output device, focusing their gaze on or near the output device, standing in front of the output device, walking toward the output device, or any combination thereof.

7. The interactive portrait system of claim 1, comprising a communication device communicatively coupled to the controller, wherein the communication device is configured to communicate with a portable object carried by the guest to retrieve an identifier from the portable object.

8. The interactive portrait system of claim 7, wherein the controller is configured to use the identifier to search a database for achievements associated with the identifier, and the initial output, the additional output, or both are based on the achievements associated with the identifier.

9. The interactive portrait system of claim 1, wherein the controller is configured to use the one or more artificial intelligence algorithms to provide the initial output, the additional output, or both in a manner that is personalized for the guest based on the imagery.

10. An entertainment venue, comprising:
a path that traverses an interactive area;
a display and a speaker located proximate to the interactive area;
a camera configured to capture imagery of the interactive area;
a microphone configured to capture sounds within the interactive area; and
a controller configured to:
analyze the imagery to identify a guest traveling along the path toward the interactive area;
instruct the display, the speaker, or both to provide an initial output to attempt to interact with the guest as the guest approaches the interactive area;
analyze the imagery, the sounds, or both to identify a behavior of the guest during the initial output, after the initial output, or both;
evaluate the behavior of the guest using one or more artificial intelligence algorithms to determine whether the guest responded to the initial output; and
in response to determining that the guest responded to the initial output, instruct the display and the speaker to provide an additional output to conduct a conversational interaction with the guest.

11. The entertainment venue of claim 10, wherein the initial output comprises a first animation, the additional output comprises a second animation, and the second animation is larger than the first animation.

12. The entertainment venue of claim 10, wherein the initial output comprises a first sound, the additional output comprises a second sound, and the first sound is quieter than the second sound.

13. The entertainment venue of claim 10, wherein the controller is configured to analyze the imagery to identify one or more characteristics of the guest, and the initial output, the additional output, or both are based on the one or more characteristics of the guest.

14. The entertainment venue of claim 10, wherein the behavior comprises:
the guest turning their head toward the display, the speaker, or both;
the guest focusing their gaze on or near the display, the speaker, or both;
the guest speaking words or phrases related to the initial output; or
any combination thereof.

15. The entertainment venue of claim 10, comprising a communication device communicatively coupled to the controller;
wherein the communication device is configured to communicate with a portable object carried by the guest to retrieve an identifier from the portable object;
wherein the controller is configured to use the identifier to search a database for achievements associated with the identifier;
wherein the initial output, the additional output, or both are based on the achievements associated with the identifier.

16. The entertainment venue of claim 10, wherein the controller is configured to use the one or more artificial intelligence algorithms to carry out the conversational interaction.

17. A method of operating an interactive portrait system in an entertainment venue, the method comprising:
analyzing, using one or more processors, imagery captured by a camera to identify a behavior of a guest as the guest travels along a path that traverses an interactive area of the entertainment venue;
evaluating, using the one or more processors, the behavior of the guest to determine whether the guest demonstrated signs of interest in the interactive area of the entertainment venue;
analyzing, using the one or more processors, the imagery to identify one or more characteristics of one or more items worn or carried by the guest;
in response to determining that the guest demonstrated signs of interest in the interactive area of the entertainment venue and using the one or more processors, instructing an output device to provide an initial output to attempt to interact with the guest as the guest approaches the interactive area of the entertainment venue, wherein the initial output is based on the one or more characteristics of the one or more items worn or carried by the guest;
evaluating, using the one or more processors, the behavior of the guest during the initial output, after the initial output, or both to determine whether the guest responded to the initial output; and
in response to determining that the guest responded to the initial output and using the one or more processors, instructing the output device to provide an additional output to conduct a conversational interaction with the guest.

18. The method of claim 17, wherein:
the one or more items comprise clothing worn by the guest, an accessory worn by the guest;
a personal possession carried by the guest, or any combination thereof; and
the one or more characteristics comprise a color, a type, a print, or any combination thereof.

19. The method of claim 17, comprising evaluating, using the one or more processors, the behavior of the guest using one or more artificial intelligence algorithms.

20. The method of claim 17, comprising analyzing, using one or more processors, sounds captured by a microphone to identify the behavior of the guest.

\* \* \* \* \*